(12) United States Patent
Aso et al.

(10) Patent No.: US 10,135,311 B2
(45) Date of Patent: Nov. 20, 2018

(54) STATOR FOR ELECTRIC MOTOR, MOLDED ELECTRIC MOTOR, AND AIR CONDITIONER

(71) Applicant: Mitsubishi Electric Corporation, Tokyo (JP)

(72) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP); Yuto Urabe, Tokyo (JP); Junichi Ono, Tokyo (JP); Shigeru Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 304 days.

(21) Appl. No.: 15/125,377

(22) PCT Filed: Apr. 22, 2014

(86) PCT No.: PCT/JP2014/061301
§ 371 (c)(1),
(2) Date: Sep. 12, 2016

(87) PCT Pub. No.: WO2015/162692
PCT Pub. Date: Oct. 29, 2015

(65) Prior Publication Data
US 2017/0093243 A1    Mar. 30, 2017

(51) Int. Cl.
*H02K 3/30*    (2006.01)
*H02K 3/34*    (2006.01)
(Continued)

(52) U.S. Cl.
CPC ............ *H02K 3/345* (2013.01); *H02K 3/28* (2013.01); *H02K 3/30* (2013.01); *H02K 3/325* (2013.01);
(Continued)

(58) Field of Classification Search
CPC .......... H02K 3/325; H02K 3/34; H02K 3/345; H02K 3/522; H02K 15/095
See application file for complete search history.

(56) References Cited

U.S. PATENT DOCUMENTS

| 2002/0047460 | A1 | 4/2002 | Yoneda et al. |
| 2013/0043749 | A1 | 2/2013 | Nonoguchi et al. |
| 2013/0169085 | A1 | 6/2013 | Taema |

FOREIGN PATENT DOCUMENTS

| CN | 103004058 A | 3/2013 |
| JP | 2004-096838 A | 3/2004 |

(Continued)

OTHER PUBLICATIONS

Office Action corresponding to Chinese Patent Application No. 201480078051.4 dated May 2, 2018 with English translation.
(Continued)

*Primary Examiner* — Ramon M Barrera
(74) *Attorney, Agent, or Firm* — Posz Law Group, PLC

(57) ABSTRACT

A stator for an electric motor includes: a stator core that includes a plurality of teeth on which insulating portions are provided; and a coil formed by winding a wire around each of the teeth. A lead-in opening and a lead-out opening are formed in insulating portions provided on an outside diameter side of the stator core. The lead-in opening leads in a crossover wire of the coil routed to an outer peripheral side of the insulating portions to the side of the teeth. The lead-out opening leads out the crossover wire of the coil from the side of the teeth to the outer peripheral side of the
(Continued)

insulating portions. The length from an axial end portion of the stator core on an insulating portion side to the lead-in opening is different from the length from the axial end portion to the lead-out opening.

13 Claims, 7 Drawing Sheets

(51) Int. Cl.
    *H02K 3/32*     (2006.01)
    *H02K 3/28*     (2006.01)
    *H02K 5/02*     (2006.01)
    *H02K 3/52*     (2006.01)
    *H02K 15/04*     (2006.01)
    *H02K 15/095*     (2006.01)

(52) U.S. Cl.
    CPC ............... *H02K 3/522* (2013.01); *H02K 5/02* (2013.01); *H02K 15/0435* (2013.01); *H02K 15/095* (2013.01)

(56) References Cited

FOREIGN PATENT DOCUMENTS

| JP | 2008-187779 A | 8/2008 |
|----|---------------|--------|
| JP | 2009-268178 A | 11/2009 |
| JP | 2009-303438 A | 12/2009 |
| JP | 2010-130833 A | 6/2010 |
| JP | 2011-030309 A | 2/2011 |
| JP | 2011-035947 A | 2/2011 |
| JP | 2001-275325 A | 10/2011 |
| JP | 2013-138585 A | 7/2013 |

OTHER PUBLICATIONS

Japanese Office Action dated Apr. 25, 2017 for the corresponding JP application No. 2016-514583. (English translation attached).
International Search Report of the International Searching Authority dated Jul. 22, 2014 for the corresponding International application No. PCT/JP2014/061301 (and English translation).

STATOR FOR ELECTRIC MOTOR, MOLDED ELECTRIC MOTOR, AND AIR CONDITIONER

CROSS REFERENCE TO RELATED APPLICATION

This application is a U.S. national stage application of International Patent Application No. PCT/JP2014/061301 filed on Apr. 22, 2014, the disclosure of which is incorporated herein by reference.

TECHNICAL FIELD

The present invention relates to a stator for an electric motor, a molded electric motor, and an air conditioner.

BACKGROUND

In the conventional stator for an electric motor exemplified in Patent Literature 1 below, insulating portions provided to teeth have wound thereabout magnet wires in order to form coils, and crossover wires between the coils are routed around the outer periphery of connection-side insulating portion located axially outward from the stator core end face. In the conventional stator for an electric motor, in each phase, a lead-out opening for a crossover wire to the outer periphery of the connection-side insulating portion has substantially the same height as a lead-in opening from the outer periphery of the connection-side insulating portion, and a plurality of crossover wires laid between adjacent different phases are axially aligned without contacting each other.

PATENT LITERATURE

Patent Literature 1: Japanese Patent Application Laid-Open No. 2004-96838

Patent Literature 1 above, however, does not disclose a method for avoiding interference between a plurality of crossover wires laid in the same phase and has a problem of being unable to address the need to further improve the quality of the stator.

SUMMARY

The present invention has been made in view of the above and has an object of providing a stator for an electric motor, a molded electric motor, and an air conditioner capable of further improving the quality.

In order to solve the above problems and achieve the object, an aspect of the present invention is a stator for an electric motor including: a stator core that includes a plurality of teeth on which insulating portions are provided; and a coil formed by winding a wire around each of the teeth. A lead-in opening and a lead-out opening are formed in insulating portions provided on an outside diameter side of the stator core, the lead-in opening leading in a crossover wire of the coil routed to an outer peripheral side of the insulating portions to a teeth side, the lead-out opening leading out the crossover wire of the coil from the teeth side to the outer peripheral side of the insulating portions, and a length from an axial end portion of the stator core on an insulating portion side to the lead-in opening is different from a length from the axial end portion to the lead-out opening.

This invention achieves an effect of being able to further improve the quality by having a configuration to prevent interference between a plurality of crossover wires laid in the same phase.

DETAILED DESCRIPTION

Hereinafter, an embodiment of a stator for an electric motor, a molded electric motor, and an air conditioner according to the present invention will be described in detail with reference to the drawings. This invention is not limited to the embodiment.

Embodiment

Figure 1:
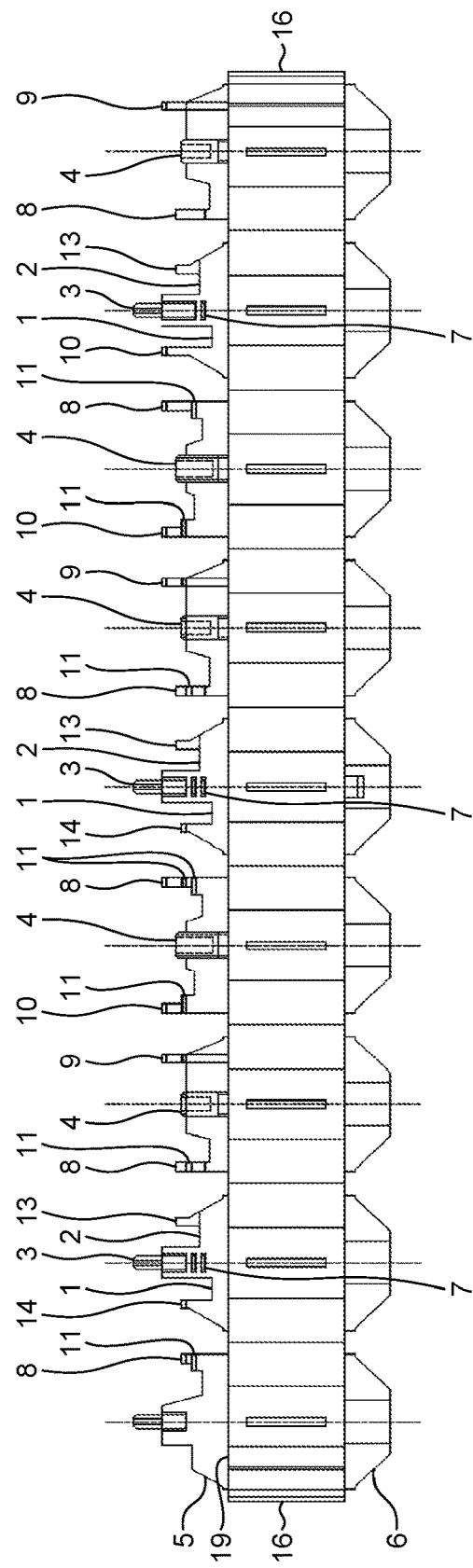
FIG. 1 is a diagram, developed linearly, illustrating a stator core on which insulating portions are provided.
Figure 2:
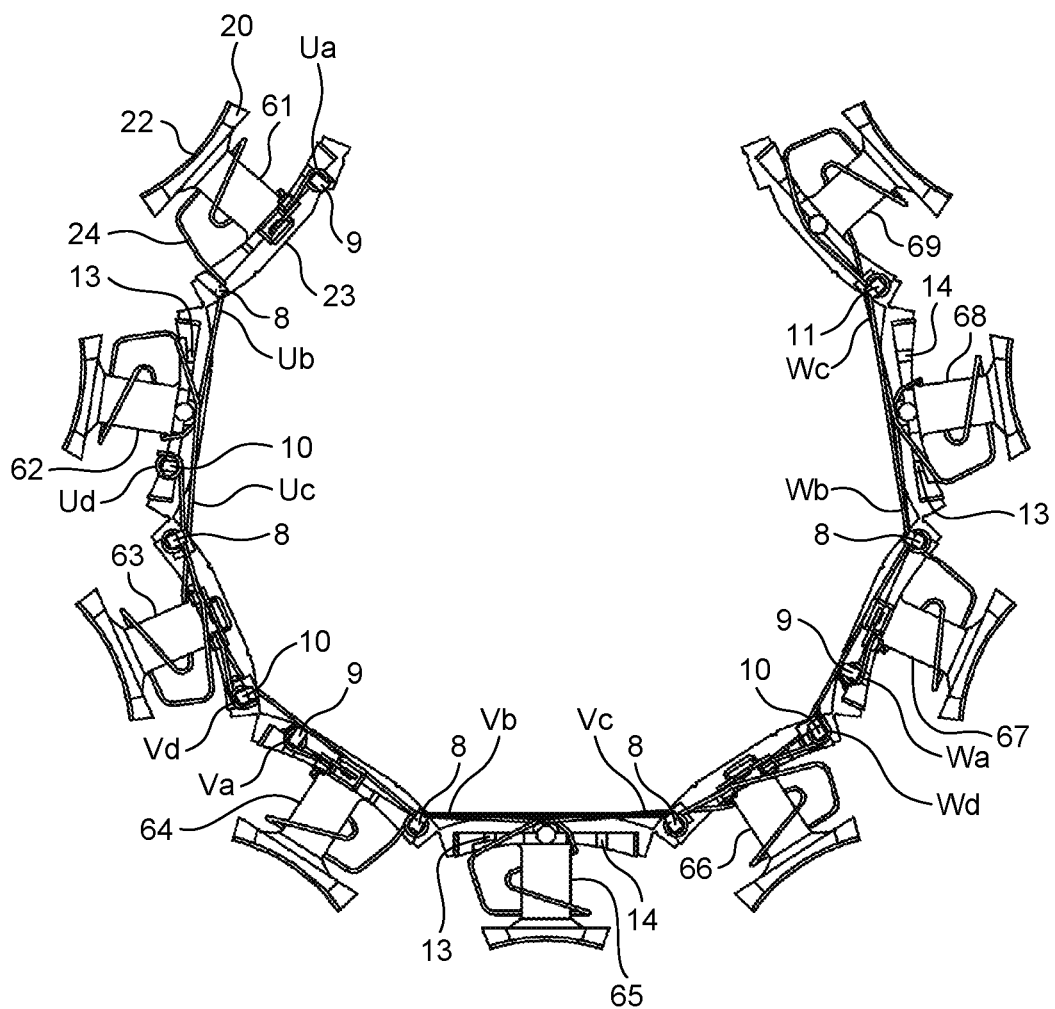
FIG. 2 is a diagram of a stator for an electric motor according to an embodiment of the present invention bent inversely and including magnet wires.
Figure 3:
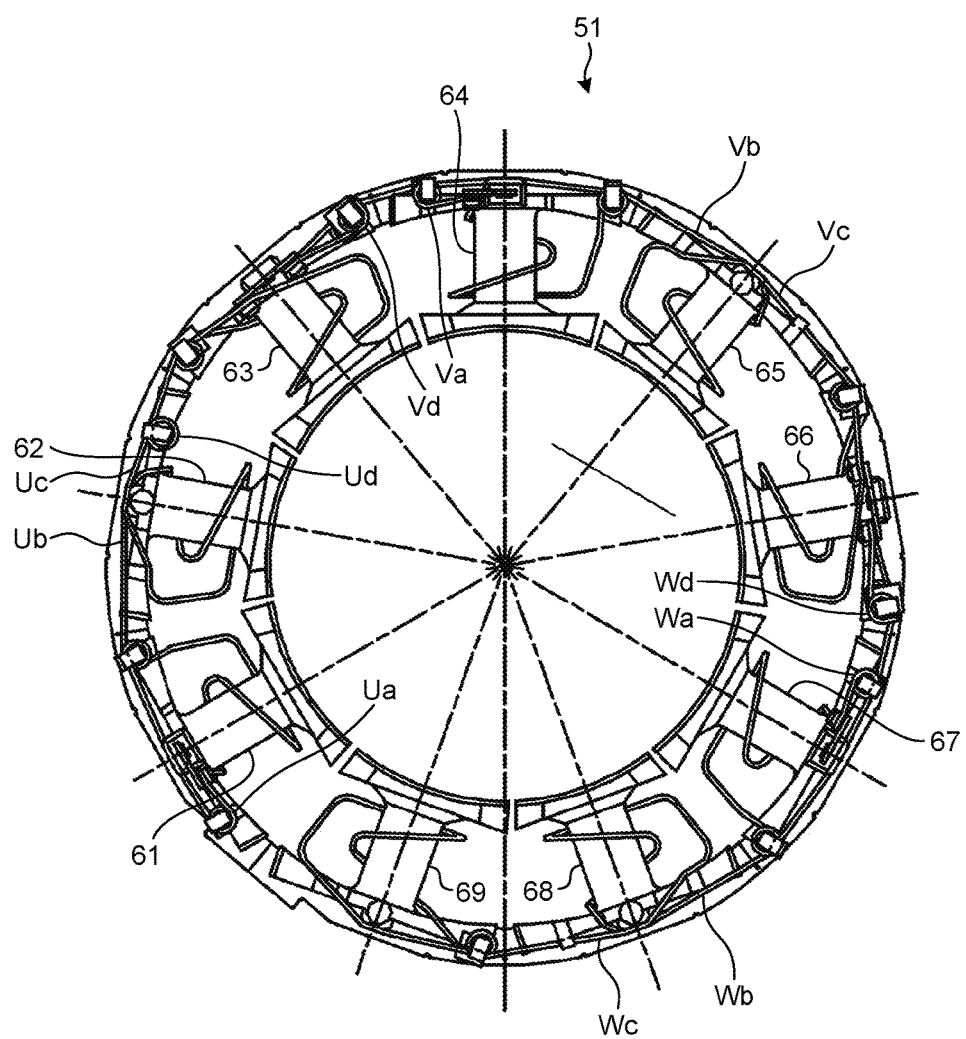
FIG. 3 is a diagram illustrating the stator for an electric motor according to the embodiment of the present invention.
Figure 4:
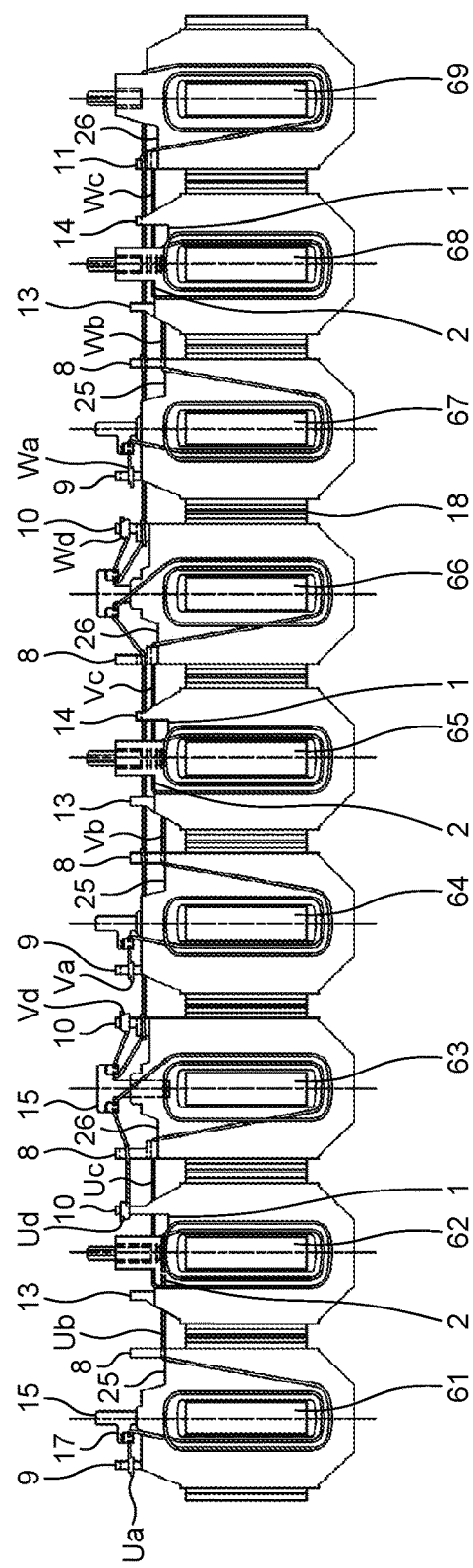
FIG. 4 is a diagram illustrating the stator core illustrated in FIG. 1 including magnet wires.
Figure 5:
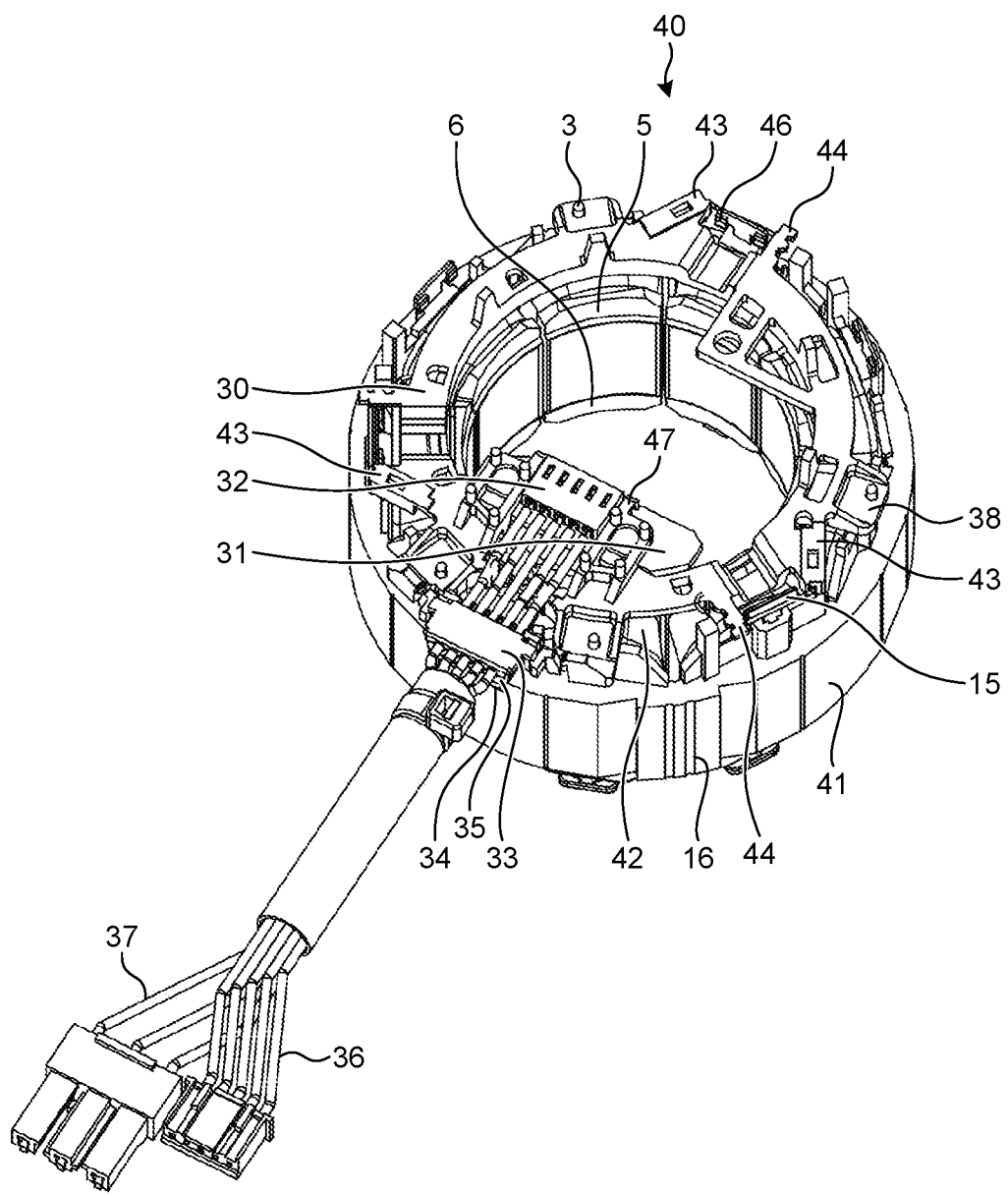
FIG. 5 is a perspective view of a stator assembly.
Figure 6:
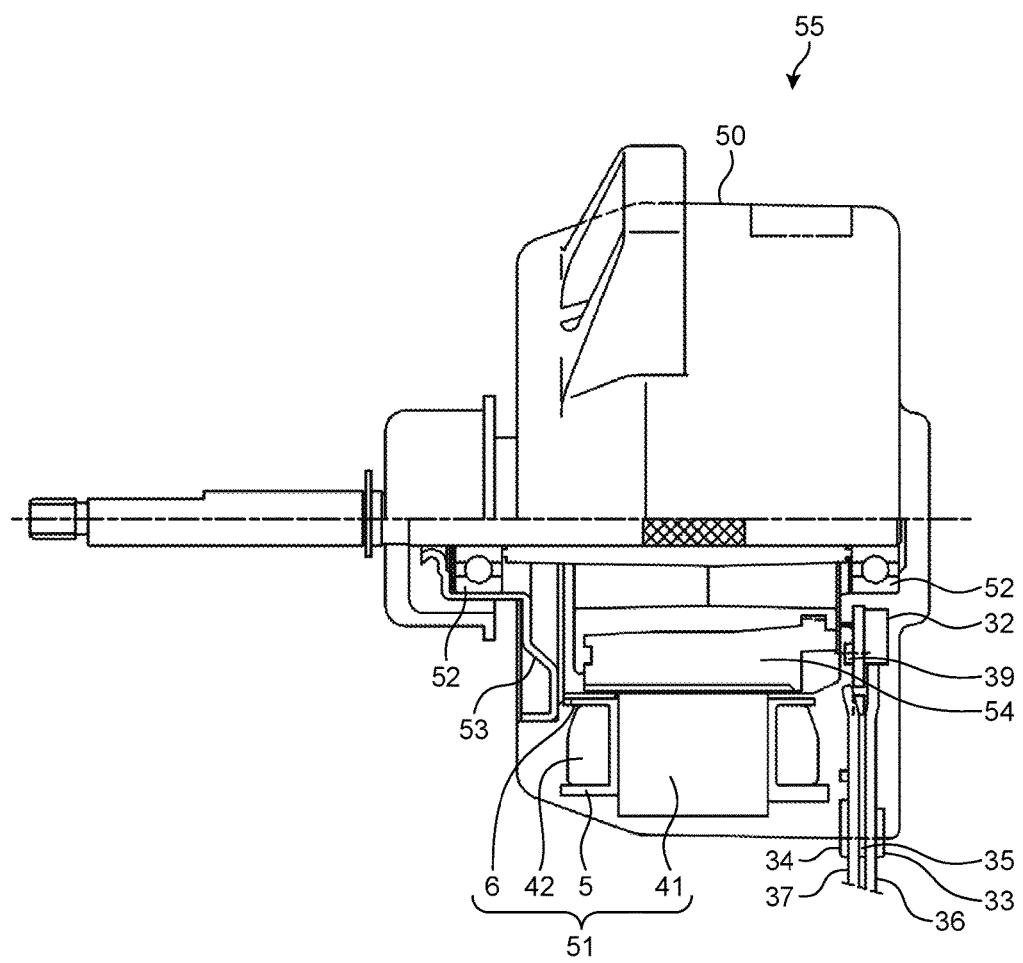
FIG. 6 is a side view of a molded electric motor according to the embodiment of the present invention.

FIG. 1 is a diagram, developed linearly, illustrating a stator core on which insulating portions are provided. FIG. 2 is a diagram of a stator for an electric motor according to an embodiment of the present invention bent inversely and including magnet wires. FIG. 3 is a diagram illustrating the stator for an electric motor according to the embodiment of the present invention. FIG. 4 is a diagram illustrating the stator core illustrated in FIG. 1 including magnet wires. FIG. 5 is a perspective view of a stator assembly. FIG. 6 is a side view of a molded electric motor according to the embodiment of the present invention.

A stator core 41 illustrated in FIG. 5 includes a plurality of core segments as illustrated in FIGS. 1 to 4. Each core segment is provided by stamping an electromagnetic steel plate into a predetermined shape and then stacking a plurality of core segment pieces thus stamped on one another by crimping, welding, bonding, or the like.

The core segments include teeth 61 to 69, tooth distal ends 20, and core backs 23. Insulating portions are formed on the teeth 61 to 69, the tooth distal ends 20, and the core backs 23 of the core segments by integrally molding a thermoplastic resin such as polybutylene terephthalate (PBT) with the stator core 41 or by mounting of components. By forming the insulating portions by resin molding onto the stator core 41, the insulating portions can be reduced in thickness, and the processing cost can be reduced. In the illustrated example, the teeth 61 to 63 constitute a U phase, the teeth 64 to 66 constitute a V phase, and the teeth 67 to 69 constitute a W phase. In the following description, the side of the stator core 41 on which terminals 15 are provided is referred to as a connection side, and the opposite side is referred to as a counter-connection side.

Each core segment is formed with a connection-side insulating portion 5 axially outward from a connection-side axial end portion 19 of the stator core 41 and is formed with a counter-connection side insulating portion 6 on the counter-connection side. Further, a plurality of pins 8, 9, 10, 13, and 14 are provided to the connection-side insulating portions 5.

The pins 8 are pins for winding crossover wires. To the pins 9, winding start terminals (Ua, Va, Wa) of magnet wires 24 of the respective phases are connected. To the pins 10, winding end terminals (Ud, Vd, Wd) of the magnet wires 24 of the respective phases are connected. The pins 13 are pins for holding crossover wires led into lead-in openings 1 toward the outer peripheral side of the connection-side insulating portions 5. The pins 14 are pins for holding crossover wires led out from lead-out openings 2 to the outer peripheral side of the connection-side insulating portions 5.

In the example of FIGS. 2 to 4, the magnet wires 24 are individually wound around the teeth 61 to 63 of the U phase, the teeth 64 to 66 of the V phase, and the teeth 67 to 69 of the W phase. By starting the winding of the magnet wires 24 from the respective pins 9 of the tooth 61, the tooth 64, and the tooth 67, the U, V, and W phases can be wound simultaneously.

Hereinafter, with reference to FIG. 4, a process of forming coils 42 will be described. After several turns of the terminal Ua of the magnet wire 24 are wound around the pin 9, the magnet wire 24 is hooked on a hook 17 of the terminal 15 and wound around the tooth 61 on which an insulating portion is provided to form a first coil 42.

After the coil 42 of the tooth 61 is formed, the magnet wire 24 is led out from a lead-out opening 25 of the connection-side insulating portion 5 of the tooth 61 to the outer peripheral side of the connection-side insulating portion 5, and is routed to the adjacent tooth 62 side as a crossover wire Ub. Then, the crossover wire Ub is led in from the lead-in opening 1 of the connection-side insulating portion 5 of the tooth 62 to the tooth 62 side. The magnet wire 24 led in is wound around the tooth 62 on which an insulating portion is provided. This forms a second coil 42.

After the coil 42 of the tooth 62 is formed, the magnet wire 24 is led out from the lead-out opening 2 of the connection-side insulating portion 5 of the tooth 62 to the outer peripheral side of the connection-side insulating portion 5, and is routed to the adjacent tooth 63 side as a crossover wire Uc. After being wound around the pin 8, the crossover wire Uc is led in from a lead-in opening 26 of the connection-side insulating portion 5 of the tooth 63 to the tooth 63 side. The magnet wire 24 led in is wound around the tooth 63 on which an insulating portion is provided. This forms a third coil 42.

After the coil 42 of the tooth 63 is formed, the magnet wire 24 is routed to the connection-side insulating portion 5 side of the tooth 62 as a winding end wire. Then, a terminal Ud of the magnet wire 24 is wound around the pin 10 provided to the connection-side insulating portion 5 of the tooth 62.

In FIG. 4, when the magnet wire 24 of the coil 42 formed at the tooth 63 is a winding end wire of the U phase and the magnet wire 24 of the coil 42 formed at the tooth 66 is a winding end wire of the V phase, the winding end wire of the U phase is routed to the terminal 15 on which the winding end wire of the V phase is hooked (terminal provided to the tooth 63). This forms a neutral point. By thus routing a winding end wire to the terminal 15 on which a winding end wire of a different phase is hooked and forming a neutral point, connection work can be performed without using a component for forming a neutral point, and the cost of the electric motor can be reduced.

The magnet wires 24 are treated with the same process in the V phase and the W phase, and thereby the coils 42 of a stator 51 are formed. Thus, in the stator 51 in the present embodiment, crossover wires are wound around pins formed at insulating portions of adjacent different phases. That is, all the terminals and all the crossover wires of the magnet wires 24 are treated at the connection-side insulating portions 5. This eliminates the need to route the magnet wires 24 to the counter-connection side, and allows an increase in productivity, an improvement in quality due to a reduction in process steps, and a resulting reduction in cost.

After the formation of the coils 42 for the three phases is completed, the core segments illustrated in FIG. 4 are bent such that inside diameter portions 22 of the tooth distal ends 20 face one another as in FIG. 3, with connection portions 18 formed between adjacent core segments as seams. After core mating surfaces 16 (see FIG. 1) provided to both sides of the stator core 41 are put together, the core mating surfaces 16 are subjected to welding and fixed (see FIG. 5). Joining of the terminals of the magnet wires 24 and the terminals 15 is performed by fusing, soldering, brazing, or the like.

The stator 51 according to the present embodiment is formed such that the length from the axial end portion 19 of the stator core 41 to the lead-in openings 1 is different from the length from the axial end portion 19 to the lead-out openings 2. Therefore, even when the crossover wire Ub led into one tooth, for example, the U-phase tooth 62, crosses the crossover wire Uc led out from the tooth 62, interference between the crossover wires can be avoided. The stator 51 according to the present embodiment is formed such that the length from the axial end portion 19 to the lead-in openings 1 is less than the length from the axial end portion 19 to the lead-out openings 2. Therefore, the crossover wires led out from the coils wound around the respective teeth can be laid axially outward from the crossover wires led into the lead-in openings 1, facilitating the laying out of crossover wires.

In the stator 51 according to the present embodiment, grooves 7 (see FIG. 1) are formed in the outer peripheral side of the connection-side insulating portions 5. The grooves 7 have a groove shape depressed radially inward from the outer peripheral surface of the connection-side insulating portions 5, and they are formed such that the depth on the side to lead crossover wires into the lead-in openings 1 is less than the depth on the side to lead crossover wires out to the outer peripheral side of the connection-side insulating portions 5. The surface of the grooves 7 on the outside diameter side (the surface of lead-in openings for the crossover wires) is located at the same height as the outer peripheral surface of the connection-side insulating portions 5, for example.

By providing the grooves 7, crossover wires can be led into the depressions of the grooves 7 while being pressed against the outer peripheral surface of the connection-side insulating portions 5, resulting in improved workability when connecting the magnet wires 24. Because the surface of the grooves 7 on the outside diameter side is located at the same height as the outer peripheral surface of the connection-side insulating portions 5, the machining of a mold is facilitated.

In the stator 51 according to the present embodiment, tying pins (including the pins 8, the pins 9, and the pins 10) are formed with one or a plurality of fastening portions 11 for fastening crossover wires. For example, the pin 8 provided to the fourth core segment from the left in FIG. 1 includes a plurality of fastening portions 11. Of the plurality of fastening portions 11, the fastening portion 11 on the tip side of the pin 8 is formed with a height (radial and circumferential height) less than the height (radial and circumferential height) of the fastening portion 11 provided on the side opposite to the tip.

The shape of the fastening portions 11 may be, for example, a circular shape surrounding the outer periphery of the pins or may be a protruding shape protruding radially from the outer peripheral surface of the pins.

By providing the fastening portions 11, positional displacement of crossover wires can be prevented, and a separation distance between crossover wires can be provided.

At points where crossover wires need to be tied on (wound around) the pins several times, the crossover wires can be tied on the tip side of the pins while the crossover wires are fastened on the fastening portions 11 one size larger on the side opposite to the tips of the pins, resulting in improved winding workability.

In the stator 51 in the present embodiment, the pins 9 and 10 are used for starting and ending the winding of the magnet wires 24. In place of the pins 9 and 10, for example, the magnet wires 24 can be fixed into hooks by compressing the hooks after hooking the magnet wires 24 on the hooks.

In the stator 51 in the present embodiment, the fastening portions 11 are provided to the tying pins, and the grooves 7 are provided in the outer peripheral side of the connection-side insulating portions 5. Alternatively, only either the fastening portions 11 or the grooves 7 may be used.

In the present embodiment, the terminals 15 connected to the winding end terminals of the respective phases are used to form neutral points. Alternatively, a winding start terminal may be used as a neutral point, or a neutral point connection part may be used, for example, to form a neutral point.

The stator 51 in the present embodiment can also be used as a stator for an electric motor of an outer rotor structure in which a rotor is provided on the outside of the stator 51.

Accordingly, the stator 51 of an electric motor according to the present embodiment allows an increase in productivity and a resulting improvement in quality and reduction in cost. Further, the counter-connection side insulating portions 6 are not used for terminal treatment and treatment of crossover wires; therefore, the counter-connection side insulating portions 6 can be used for improving the functions of an electric motor or for other purposes.

Next, a configuration example of a molded electric motor 55 incorporating the stator 51 is described.

A molded stator 50 illustrated in FIG. 6 is obtained by molding the stator 51, a sensor substrate 31, and others components with a thermosetting resin such as bulk molding compound (BMC).

A wall (outer wall) on the outside diameter side on the connection side that prevents the coils 42 from leaning toward the outside diameter side of the stator 51 includes a plurality of protrusions that fix a lead wiring part 30. A wall (inner wall) on the inside diameter side on the counter-connection side that prevents the coils 42 from leaning toward the inside diameter side also includes protrusions. The protrusions are axially brought into contact with and fixed on a mold core metal portion when the stator 51 is placed thereon to mold the stator 51.

The distal edge of the axial end of the outer wall is formed such that its height is greater than the axial maximum height of the coils 42. It is desirable to form the protrusions on the inner wall to have the same height as the distal edge of the axial end of the outer wall. The coils 42 are formed such that its axial height decreases from the outer wall to the inner wall. Therefore, when the height of the protrusions on the inner wall is set the same as the height of the outer wall, a sufficient distance from the protrusions on the inner wall to the coils 42 is provided. Accordingly, when the stator 51 is placed on the mold core metal portion with the counter-connection side of the stator core 41 down, the stator core 41 can be stably placed without the coils 42 being in contact with the mold core metal portion. As a result, productivity is increased and quality is improved.

Power supply leads 37 that supply power to the coils 42 are routed to the terminals to which the terminals of the magnet wires 24 are joined, and they are stripped of their covers and joined to the terminals 15 by spot welding, soldering, or the like. On the sensor substrate 31, electronic components, such as a Hall IC, a position detection element 39 for a rotor 54, and others are mounted. Sensor leads 36 are connected to the sensor substrate 31. A board-in connector 32 is connected to the sensor leads 36. A terminal of the board-in connector 32 is electrically joined to the electronic components by soldering.

The lead wiring part 30 is used for the wiring of the power supply leads 37 and the sensor leads 36. The lead wiring part 30 is formed in a substantially circular shape with a thermoplastic resin such as PBT. A lead-out part 35 is attached to the outer periphery of the lead wiring part 30. The lead-out part 35 comes out from the outer peripheral surface of the molded stator 50.

A plurality of attaching legs 38 are provided to the outer periphery of the lead wiring part 30. The attaching legs 38 each include a hole for inserting a protrusion 3 provided to the connection-side insulating portions 5. The protrusions 3 are provided in insertion holes 4 of the connection-side insulating portions 5 illustrated in FIG. 1. When the lead wiring part 30 is attached to the stator, the attaching legs 38 abut the installation surface of the stator insulating portions for the lead wiring part 30 for axial positioning. By inserting the protrusions 3 of the insulating portions into the holes of the attaching legs 38, the lead wiring part 30 is positioned in the rotational direction.

The power supply leads 37 of the three phases are routed to the terminals 15 of the stator 51 disposed at intervals of approximately 120°. By their terminals stripped of the cover contacting the walls of lead terminal retainers 43, the power supply leads 37 are positioned.

When the lead wiring part 30 is attached to the stator 51, the power supply leads 37 are routed to the lead-out part side along the inner wall of the lead wiring part 30 and are bent toward the lead-out part at a folded-back section. Then, the power supply leads 37 are fitted in between power supply lead retaining protrusions of the lead-out part and held in place.

At this time, the power supply lead 37 routed to the lead terminal retainer 43 farthest from the lead-out part 35 is routed to a power supply lead retainer provided at the center of the lead-out part 35. The power supply leads 37 laid to the lead terminal retainers 43 on both sides of the lead-out part 35 are routed to power supply lead retainers other than that at the center of the lead-out part 35.

However, any one of the two leads other than the power supply lead 37 laid at the farthest position is routed around the outside of the power supply lead 37 laid at the farthest position.

Core retainers 44 including the lead terminal retainers 43 in pairs are formed on the outer peripheral side of the lead wiring part 30. When the lead wiring part 30 is attached to the stator 51, the cores of the power supply leads 37 led out from the lead terminal retainers 43 are routed to the core retainers 44 so that the terminals 15 are in proximity to the cores, and are retained by the core retainers 44.

The lead wiring part 30 is formed with electrode escape recesses in order to provide spaces for electrodes 46 sandwiching the terminals 15 of the stator 51 and the cores of the power supply leads 37. By providing the electrode escape recesses, the power supply leads 37 are routed closer to the stator side from the lead wiring surface of the lead wiring part 30. Further, protrusions for preventing positional displacement of the leads are provided on both sides of the recesses for axial positioning.

The lead-out part 35 is formed with a plurality of engaging portions for retaining two types of lead retention parts.

A first engaging portion of the lead-out part 35 is an engaging portion for a sensor lead retention part 33 opening opposite to the center side of the lead wiring part 30. The sensor lead retention part 33 is inserted toward the center of the lead wiring part 30 and attached thereto.

A second engaging portion of the lead-out part 35 is an engaging portion for a power supply lead retention part 34 opening toward the center side of the lead wiring part 30. The power supply lead retention part 34 is inserted outward from the center side of the lead wiring part 30 and attached thereto.

The power supply lead retention part 34 includes legs that extend vertically from the installation surface of the lead-out part 35 and are hooked onto the engaging portion for the lead retention part. Further, the tips of the legs have protrusions that are axially positioned at the engaging portion of the lead-out part 35.

After the lead wiring part 30 is laid with the power supply leads 37, the power supply lead retention part 34 is engaged with the second engaging portion of the lead-out part 35 and attached thereto. When the power supply lead retention part 34 is engaged with the lead-out part 35, a rib provided to the power supply lead retention part 34 abuts the lead-out part 35, thereby limiting the amount of opening through which the leads come out.

A sensor substrate retainer 47 provided on the inner peripheral side of the lead-out portion of the lead wiring part 30 has legs for attaching the sensor substrate 31. The sensor substrate 31 has a shape (such as a groove or a notch) corresponding to the attaching legs of the sensor substrate retainer 47. The sensor substrate 31 is axially fixed to the lead wiring part 30 by the attaching legs being engaged therewith.

The sensor substrate retainer 47 has a substrate holding portion expanding substantially in parallel to the sensor substrate 31. The substrate holding portion prevents the sensor substrate 31 from being deformed by resin pressure during molding. This increases the accuracy of position detection of electric motors and improves the quality of electric motors.

After the sensor substrate 31 is attached, the sensor substrate 31 and the board-in connector 32 of the sensor leads 36 are joined together by soldering. The sensor leads 36 are routed to the surface of the lead wiring part 30 opposite to the surface on which the power supply leads 37 are laid and toward the lead-out part 35. The sensor leads 36 are retained lightly by retaining protrusions provided to the lead-out part 35 and by both legs of the power supply lead retention part 34.

The sensor lead retention part 33 includes legs engaged with the lead-out part 35. After the sensor leads 36 are routed, the sensor lead retention part 33 is attached toward the center of the lead-out part 35.

Because the sensor leads 36 and the power supply leads 37 are routed to the respective surfaces of the lead wiring part 30, assembly is facilitated and cost can be reduced. The facilitated assembly results in an improvement in quality.

Further, by retaining the power supply leads 37 with the protrusions provided to the lead wiring part 30, axial positional displacement of the power supply leads 37 can be prevented, and quality can be improved.

In addition, because the lead-out part 35 has two types of engaging portions, the sensor leads 36 and the power supply leads 37 are retained by the sensor lead retention part 33 and the power supply lead retention part 34, respectively. Accordingly, the leads can be firmly attached to the lead-out part 35, and quality can be improved together with an improvement in reliability.

Moreover, the legs of the power supply lead retention part 34 are also used for retaining the sensor leads 36; therefore, assembly is facilitated and cost can be reduced. The facilitated assembly results in an improvement in quality.

The lead wiring part 30 laid with the leads is attached to the stator core 41. The protrusions 3 protruding from the attaching legs 38 of the lead wiring part 30 are fixed by heat welding, ultrasonic welding, or the like. Thus, a stator assembly 40 to which the leads are attached is obtained (see FIG. 5.)

In place of the lead wiring part 30, the sensor substrate 31 on which a wiring pattern of the leads is formed may be directly attached to the stator 51.

The stator assembly 40 is placed in a mold, and the stator 51 is molded with a molding resin of a thermosetting resin such as bulk molding compound (BMC) to provide the molded stator 50 (see FIG. 6).

When the stator assembly 40 is molded, a lead lead-out section including the sensor lead retention part 33, the power supply lead retention part 34, and the lead-out part 35 is pressed out radially outward from the center of the stator 51 by molding pressure. Consequently, the position of the lead lead-out section is maintained without contact with the stator core 41. Thus, during molding, the molding resin is not fixed with the leads in contact, and gaps are prevented from occurring at portions that the leads contact. Therefore, water that has entered from a gap or an interface between the lead lead-out section and the molding resin is prevented from traveling along gaps of the leads and reaching the sensor substrate 31. As a result, the quality of the stator 51 can be improved.

When the stator 51 is placed in the mold, the protrusion (not illustrated) on the inner wall of the counter-connection side insulating portions 6 is supported on a placement portion formed on the mold. The placement portion is, for example, a stepped portion with an outside diameter slightly larger than the dimension of the inside diameter of the stator core 41, a plurality of claws extending in a protruding shape from an opening placement surface of the mold core metal portion to the stator 51 side, or a plurality of protrusions extending from a bracket placement surface in proximity to the mold core metal portion in a state of not connecting to the inside diameter of the stator core 41. That is, the counter-connection side insulating portions are formed with a mold holding portion (protrusion) that constitutes a mold holding point during molding and that is formed axially and extends out to the stator outer periphery.

Accordingly, the stator 51 is supported on the placement portion of the mold, which thus eliminates the need to support the outer peripheral portion of the stator 51 with the mold (restricting member) during molding. Consequently, a boundary surface between the stator core 41 and the molding resin is not formed in the outer block of the molded stator 50. As a result, it becomes possible to prevent the entry of moisture into the interior of the molded stator 50, and the quality of the stator 51 can be improved.

Further, in a case where the stator 51 is supported by a protrusion on a mold, when the molded stator 50 is placed in the mold, the protrusion (not illustrated) formed on the counter-connection side of the insulating inner wall does not come out to the inside diameter side of the stator core 41; therefore, the effect of preventing the entry of water can be further improved.

The rotor 54 on which a bearing 52 is fitted is inserted into the molded stator 50 thus configured, and a bracket 53 and others are also attached. By doing this, the molded electric motor 55 is obtained (see FIG. 6).

Because the molded electric motor 55 in the illustrated example uses the stator 51 in FIG. 3, quality can be improved compared to conventional molded electric motors. Further, because the entry of moisture into the stator interior is prevented as much as possible, quality can be further improved.

Figure 7:
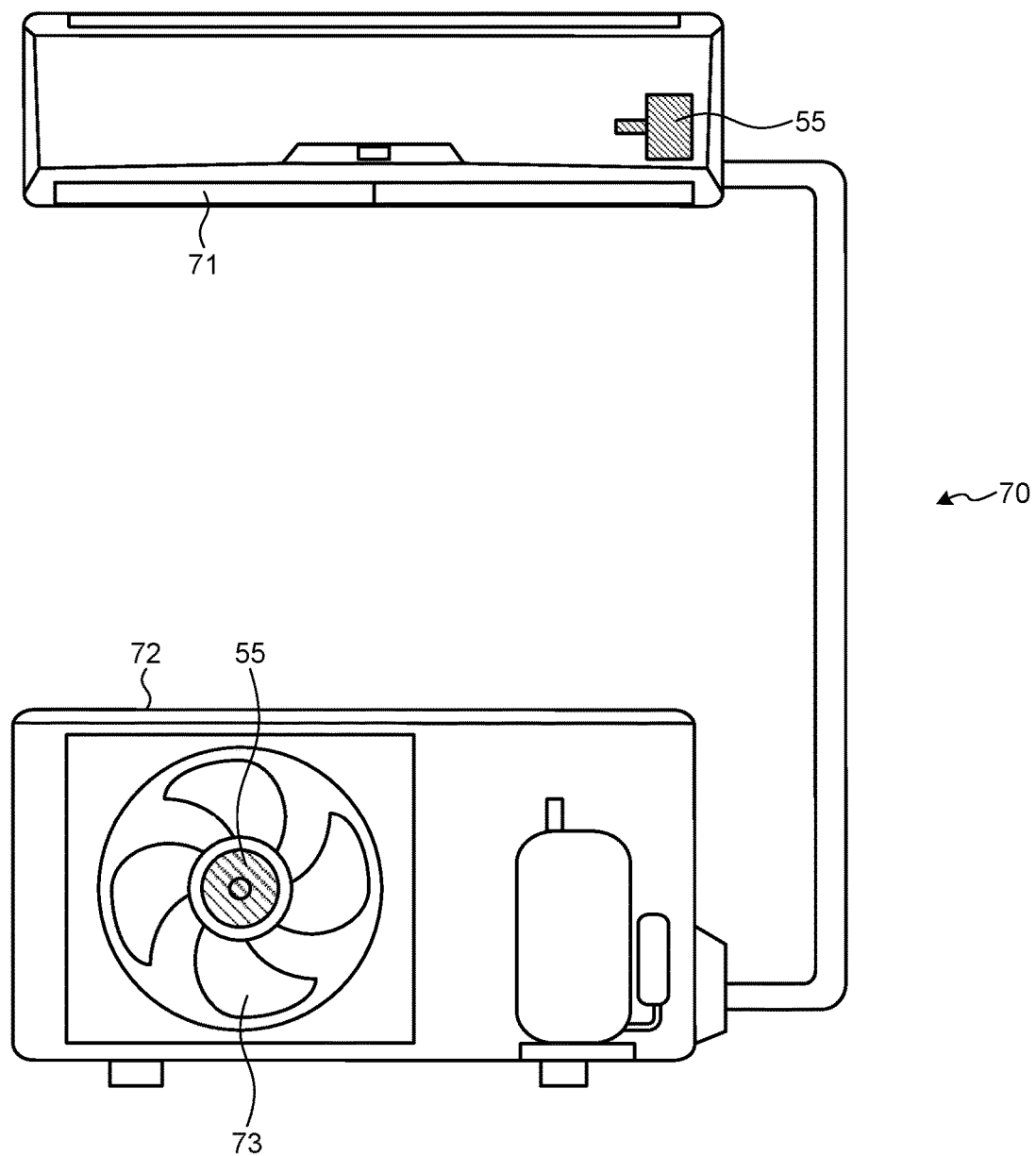
FIG. 7 is a diagram illustrating the configuration of an air conditioner according to the embodiment of the present invention.

FIG. 7 is a diagram illustrating the configuration of an air conditioner according to an embodiment of the present invention. An air conditioner 70 includes an indoor unit 71 and an outdoor unit 72 connected to the indoor unit 71. The outdoor unit 72 includes a fan 73. The indoor unit 71 also includes a fan (not illustrated). In the indoor unit 71 and the outdoor unit 72, the molded electric motor 55 in FIG. 6 is used as an electric motor for the fans. Because the stator 51 in FIG. 3 is used in the air conditioner 70 thus configured, quality can be improved compared to conventional air conditioners.

The configuration illustrated in the above embodiment is an example of the configuration of the present invention, and it can be combined with different known techniques and may be changed, for example, by partial omission without departing from the scope of the present invention as a matter of course.

INDUSTRIAL APPLICABILITY

As above, the present invention is applicable to a stator for an electric motor, a molded electric motor, and an air conditioner, and in particular, is useful as an invention capable of further quality improvement.

The invention claimed is:
1. A stator for an electric motor comprising:
a stator core that includes a plurality of insulated teeth constituting three phases; and
a coil formed by winding a wire around each of the teeth, wherein
a lead-in opening and a lead-out opening are formed in insulating portions provided on an outside diameter side of the stator core, the lead-in opening leading in a crossover wire of the coil routed to an outer peripheral side of the insulating portions to a teeth side, the lead-out opening leading out the crossover wire of the coil from the teeth side to the outer peripheral side of the insulating portions,
a length from an axial end portion of the stator core on an insulating portion side to the lead-in opening is different from a length from the axial end portion to the lead-out opening, and
a winding direction of a coil wound around one tooth of adjacent teeth among teeth constituting a same phase is different from a winding direction of a coil wound around another tooth of the adjacent teeth.

2. The stator for an electric motor according to claim 1, wherein the length from the axial end portion to the lead-in opening is less than the length from the axial end portion to the lead-out opening.

3. The stator for an electric motor according to claim 1, wherein
the insulating portions are each formed with a pin for winding the crossover wire, and
the crossover wire is wound around the pin formed at one of the insulating portions of an adjacent different phase.

4. The stator for an electric motor according to claim 3, wherein the pin is formed with one or a plurality of fastening portions that fasten the crossover wire.

5. The stator for an electric motor according to claim 4, wherein, of the fastening portions, a fastening portion on a tip side of the pin is formed to have a height less than a height of a fastening portion provided opposite to the tip side.

6. The stator for an electric motor according to claim 1, wherein grooves that receive the crossover wires are formed in the outer peripheral side of the insulating portions.

7. The stator for an electric motor according to claim 6, wherein the grooves are formed such that a depth of a groove on a side to lead the crossover wire into the lead-in opening is less than a depth of a groove on a side to lead the crossover wire out to the outer peripheral side of the insulating portions.

8. The stator for an electric motor according to claim 6, wherein the grooves have a surface on an outside diameter side thereof located at a height equal to a height of an outer peripheral surface of the insulating portions.

9. The stator for an electric motor according to claim 1, wherein the insulating portions are formed with a mold holding portion that constitutes a mold holding point during molding and that is formed axially and extends out to a stator outer periphery.

10. The stator for an electric motor according to claim 1, wherein the insulating portions are formed by resin molding on the stator core.

11. A molded electric motor using the stator for an electric motor according to claim 1.

12. An air conditioner in which the molded electric motor according to claim 11 is provided in a fan.

13. The stator for an electric motor according to claim 1, wherein a location of the lead-out opening in the insulating portion provided on the outside diameter side of the stator core including the one tooth is identical to a location of the lead-in opening in the insulating portion provided on the outside diameter side of the stator core including the another tooth.

\* \* \* \* \*